(12) United States Patent
Borrelli et al.

(10) Patent No.: US 11,024,021 B2
(45) Date of Patent: Jun. 1, 2021

(54) CHECK SYSTEM OF A PROCESS SUBJECT TO EXECUTION RULES

(71) Applicant: PRIMECONCEPT S.R.L., Rivoli (IT)

(72) Inventors: Fabio Borrelli, Turin (IT); Paolo Rossi, Turin (IT); Sergio Pozzi, Turin (IT)

(73) Assignee: PRIMECONCEPT S.R.L., Rivoli (IT)

( * ) Notice: Subject to any disclaimer, the term of this patent is extended or adjusted under 35 U.S.C. 154(b) by 8 days.

(21) Appl. No.: 16/777,285

(22) Filed: Jan. 30, 2020

(65) Prior Publication Data

US 2020/0250811 A1    Aug. 6, 2020

(30) Foreign Application Priority Data

Feb. 6, 2019    (IT) .................... 102019000001749

(51) Int. Cl.
  *G06T 7/00* (2017.01)
  *G06T 7/246* (2017.01)
  *G06K 9/00* (2006.01)

(52) U.S. Cl.
  CPC .............. *G06T 7/0008* (2013.01); *G06K 9/00* (2013.01); *G06T 7/248* (2017.01); *G06T 2207/20081* (2013.01); *G06T 2207/20084* (2013.01); *G06T 2210/21* (2013.01)

(58) Field of Classification Search
  CPC ... G06T 7/0008; G06T 7/248; G06T 2210/21; G06K 9/00
  USPC .......................................................... 382/100
  See application file for complete search history.

(56) References Cited

U.S. PATENT DOCUMENTS

| | | | |
|---|---|---|---|
| 10,133,933 B1* | 11/2018 | Fisher | H04N 5/247 |
| 2006/0039600 A1* | 2/2006 | Solem | G06K 9/00281 |
| | | | 382/154 |
| 2010/0295665 A1* | 11/2010 | Landau | G08B 21/0288 |
| | | | 340/10.42 |

FOREIGN PATENT DOCUMENTS

| | | |
|---|---|---|
| EP | 1612731 B1 | 1/2006 |
| WO | 2006111928 A2 | 10/2006 |

OTHER PUBLICATIONS

Search Report Form IT237 "Written Opinion"; dated Oct. 8, 2019 with reference to the priority Italian Patent Application No. 102019000001749.

* cited by examiner

*Primary Examiner* — Ayodeji O Ayotunde
(74) *Attorney, Agent, or Firm* — Egbert, McDaniel & Swartz, PLLC (57) ABSTRACT

A check procedure of a production process of an artifact, wherein 2D and 3D images are acquired from a work area. The images are processed in an analysis check, using neural networks, to extract data that are sent to a check cycle that checks the data in order to inform alarm situations by a signal.

2 Claims, 6 Drawing Sheets

CHECK SYSTEM OF A PROCESS SUBJECT TO EXECUTION RULES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention refers to a check system of a process subject to execution rules.

2. Description of Related Art Including Information Disclosed Under 37 CFR 1.97 and 37 CFR 1.98

In the industrial sector a production process of a product is subject to certain execution rules. The check of said production process is generally entrusted to a human operator who acts as supervisor. It appears evident that such a check system is subject to human errors.

Automated check systems with sensors and alarms have been developed recently. However, these types of check systems are ineffective, not versatile, complicated to install and not very reliable.

EP1612731 discloses a computer modeling method of a physical scene.

U.S. Ser. No. 10/133,933 discloses a system capable of automatically identifying and tracing the actions executed by subjects in a large space.

WO2006111928 discloses a system for the detection and the classification of events during motion actions, in particular for the detection of "offside" events in a football match.

BRIEF SUMMARY OF THE INVENTION

The purpose of the present invention is to eliminate the drawbacks of the prior art by disclosing a check system of a process that is reliable, versatile, flexible, adaptable to different types of processes and easy to implement.

These purposes are achieved according to the invention with the characteristics of the independent claim 1.

Advantageous embodiments of the invention appear from the dependent claims.

The purpose of the system according to the invention is to engineer and implement an industrial solution to check a process performed in a defined space area by using one or more image acquisition devices.

The general process check concept is exploded in three main objectives:
1. to check the adequacy and correctness of an activity;
2. to support the operators involved in the activity, if any;
3. to monitor the safety conditions required by the activity.

Artificial vision and artificial intelligence technologies are applied in collaborative mode to understand the events that occur in a global working space.

The system of the invention is assisted by artificial vision, image processing algorithms and control algorithms that are mainly based on artificial intelligence, in particular deep learning.

The system according to the invention refers to a production process of a product, wherein multiple active subjects (Actors) have to collaborate, respecting the steps of a process in the correct order and with the desired time and methods (motion-step method), For instance, the actors can be one or more human operators and/or one or more collaborative robots or cobots. Various predefined passive subjects (tools or instruments and components) will intervene during the process and will be suitably used by the active subjects.

Artificial vision enables the system to see what happens in each moment and deep learning enables to build control procedures and eventually improve performance over time, by simply observing the scene where a process occurs. The combination of the two technologies provides:
a. a real time control without contact, therefore without direct interference with the elements that characterize the process, without performance modifications over time with the same surrounding conditions;
b. a constant objective assessment capacity to ensure the objectivity of the process quality and efficiency.

BRIEF DESCRIPTION OF THE SEVERAL VIEWS OF THE DRAWINGS

Additional features of the invention will be clearer from the following detailed description, which refers to a merely illustrative, not limiting embodiment, which is shown in the appended figures, wherein.

DETAILED DESCRIPTION OF THE INVENTION

With reference to the Figures, the check system of a process according to the invention is described. The check system checks an activity (Job) composed of a sequences of steps (Tasks).

The Job is a complete process that is initiated from an initial status and is concluded with a final result, declaring the end of a cycle and preparing the system for a new cycle (generally in repetitive mode).

The Task of a Job involves the subjects, either partially or completely, and is concluded with a partial result that can be assessed.

Figure 1:
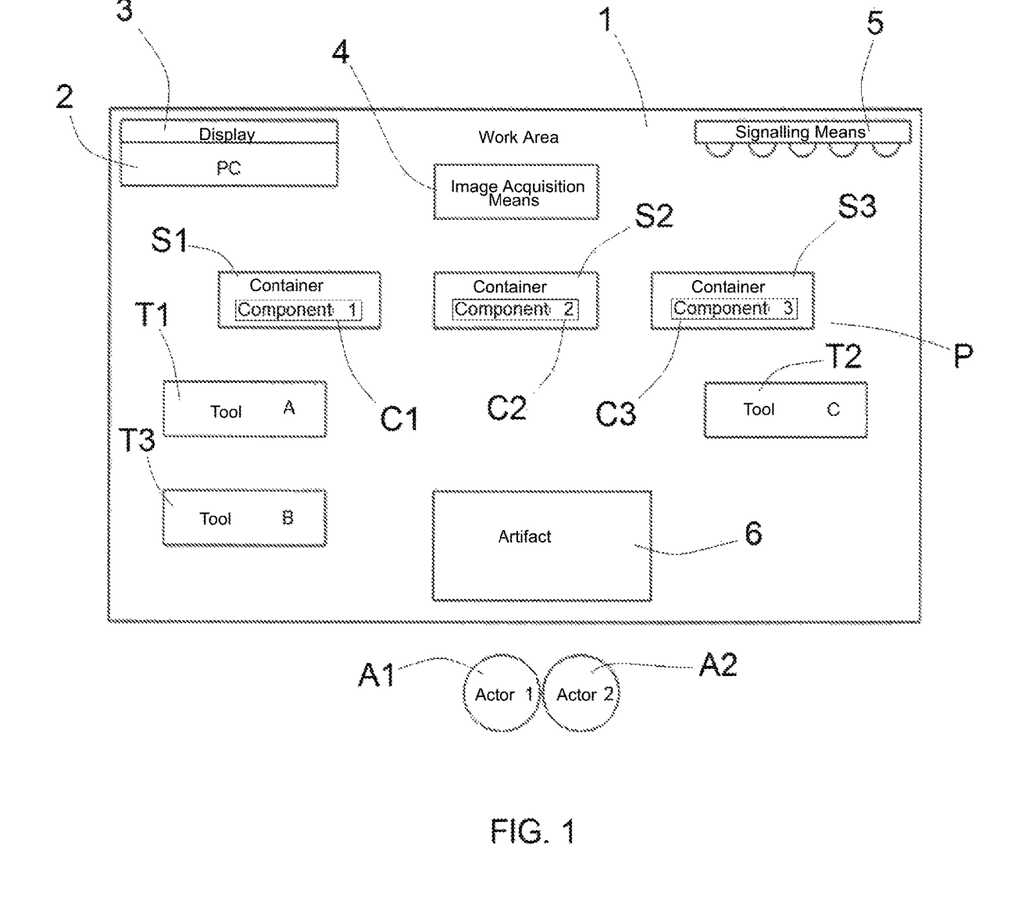
FIG. 1 is a diagrammatic drawing of a work area.

FIG. 1 shows a typical work area, which is represented by a rectangle and is generally indicated with reference numeral 1.

The work area (1) comprises: a PC (2) with a display (3), image acquisition means (4), signaling means (5), containers (S1, S2, S3) with Components (C1, C2, C3), Tools (T1, T2, T3) and an Artifact (6).

A plurality of actors (A1, A2) is disposed outside the work area (1) and is suitable for operating in the work area (1).

The PC (2) is the computer that executes a process monitoring software application. All hardware peripheral units are interfaced with the PC (2).

The display (3) of the PC is used to display the status of the Job, consult suggestions, display alarms or help functions in order to support the operator during the execution of the Tasks of the Job.

The image acquisition means (4) are cameras that continuously acquire images of the work area (1) to be monitored. According to the acquired images, the software of the PC (2) will assess the Job. The type and the position of the image acquisition means (4) must be such that the framing contains all useful characteristic elements in every instant of the production steps of the artifact (6).

The signaling means (5) are devices suitable for signaling (for example acoustically or visually) significant situations that may occur during the Job and require the attention of the operator, The containers (S1, S2, S3) are the storage areas of the components that identify the places of the work area (1) where the actors (A1, A2) are enabled to pick up the components to be assembled in order to produce the artifact (6). Each container (S1, S2, S3) contains only one type of components. Considering that the system is based on the verification of space interferences between the actors (A1, A2) and the other elements of the work area, the definition of univocal places as containers will permit to trace the use of single typologies of components, whereas the combination of places will enable to evaluate the number of interferences (or accesses) and therefore the quantities of components.

The components (C1, C2, C3) are passive subjects, i.e. elements suitable for being part of the final result of a job (for example, the smallwares that are used for assembling).

The tools (T1, T2, T3) are passive subjects, i.e. tools used by an actor for the execution of a Job, which are not part of the final result (for example, a tool used in one of more assembling steps of a product). In order to trace the tools (T1, T2, T3) individually, they must be picked up and deposited in a specific place that is different from the one used for other tools.

The artifact (6) is the final result of a job, whose progress status can be verified at the end of each work step. The artifact (6) can be manipulated during the various assembling steps, as long as the same arrangement in the space is maintained in the same step.

The actor (A1, A2) is the active subject that is responsible for the execution of a job and completes the actions that are necessary for a good result. More specifically, the actor can be the characteristic part of a subject that needs to be monitored to determine the correct execution of the actions that are necessary to complete the job (for example, a hand and/or the hands of a human operator or a tool mounted on the wrist of a robot). The actor can be an operator, and also a part of the body of an operator that contributes to the production of the artifact (6), as long as it can be always identified in the work area (1). For example, in the assembling of the artifact (6), the actors (A1, A2) can be represented by the hands of the operator. If the process does not require a different task for the two hands of the same operator, the system can accept the presence of the two similar elements (the two hands) in the work area (1) in the form of a single actor that executes only one task; otherwise, the two hands can be defined as two different actors.

The components (C1, C2, C3) and the tools (T1, T2, T3) are passive subjects indicated with P.

Figure 2:
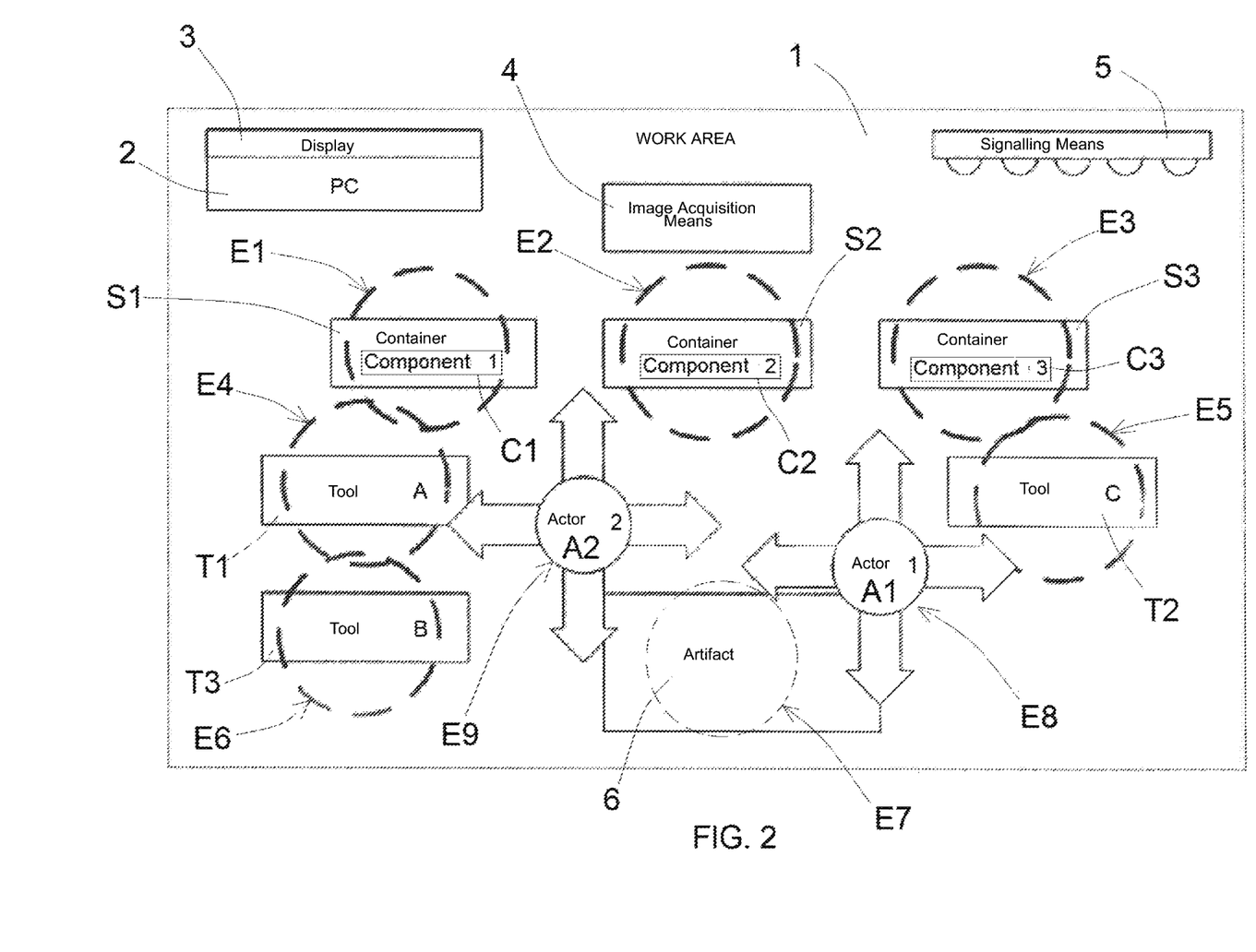
FIG. 2 shows the work area of FIG. 1, with hypothetical interference spaces.

FIG. 2 shows the work area (1) wherein interference spaces (E1, E2, E3, E4, E5, E6) shaped as circles are traced around the passive subjects (P), i.e. the containers with the components (C1, C2, C3) and the tools (T1, T2, T3).

In FIG. 2 the actors (A1, A2) are inside the work area (1) and can move in all directions to pick up the components and the tools used to assemble the artifact (6).

One or more interference spaces (E7) are also traced on the artifact according to the fact that the action performed by an actor (A1, A2) in a given step of the process involves the entire artifact (6) or multiple different areas of the artifact (6). Interference spaces (E8, E9) are also traced around the actors.

The interference spaces (E1-E9) are 3D spherical volumes characterized by a radius that can be set with center in the center of a subject of interest. When an actor (A1, A2) enters in collision with an interference space, because of relative movements, an event is generated and an interaction (or interference) between actor (A1, A2) and passive subject (P) is established.

3D information on the work scene is necessary in order to perform such an assessment, and therefore the image acquisition system (4) must simultaneously provide a 2D image with a good resolution of the work area (1) and of the actors contained in the work area (1) (which will be used for the identification of the subjects of interest), as well as a 3D map of the work area (1), i.e. the map of the physical distances of each point of the image relative to the viewpoint.

The 2D image and the 3D map must be correlated in such a way that a subject identified in the 2D image can be given a physical position in the 3D map.

By mathematically building an interference space composed of a sphere with known radius around the position of a subject, the analysis of the scene over time will consist in assessing the current position of each sphere in each moment and its collision with other spheres. Therefore, an interaction between two subjects of interest can consist for example in assessing that the distance between them is lower than the sum of the radii of the two interference spheres.

The correlated 2D images and 3D maps are normally provided by image acquisition means (or optical sensors) (4) that consist in cameras capable of generating images with 3D contents, such as ToF (Time of Flight) cameras or integrated stereoscopic cameras, or alternatively paired cameras in order to create a stereoscopic view (in such a case a correlation procedure of the two monoscopic views must be provided).

In the system of the invention, the interference spaces are directly defined on a 2D image that shows the fixed subjects of the scene: by clicking on a subject of interest, its position in the 2D space is identified. Such a position is used to calculate the position of the subject in the 3D (real) space by means of the correlated distance map. Simultaneously, the relative (spherical) interference space is dimensioned, manually allocating a value to the radius of the characteristic sphere.

Figure 3A:
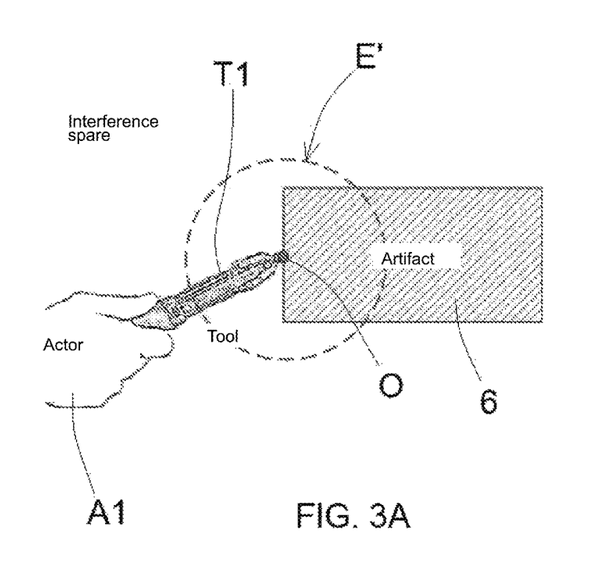
FIGS. 3A and 3B are two diagrammatic views of an incorrect dimensioning and of a correct dimensioning of an interference space, respectively.

FIG. 3A shows an interference space (E') that is erroneously allocated to an artifact. It must be considered that the artifact (6) must be worked in a point (0) that is the center of the interference space (E').

The system must generate an event every time the position of the actor (A1) enters the interference space (E') of the artifact. However, in the example of FIG. 3A, the length of the tool (T1) is not considered. Therefore, in such a case, there would be no interference between actor (A1) and artifact (6).

Figure 3B:
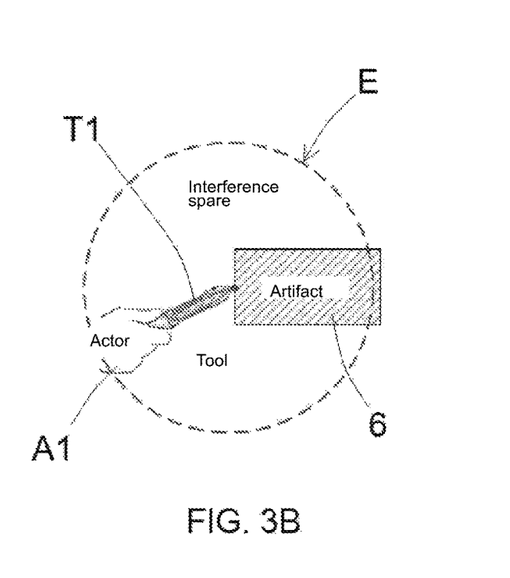

FIG. 3B shows a correct interference space (E) of the artifact (6) because the dimensions of the tool (T1) are considered in the dimensions of the interference space (E) of the artifact. In such a case, the interference space of the actor (A1) enters in collision with the interference space of the artifact (6) and an interference event is generated.

Figure 4:
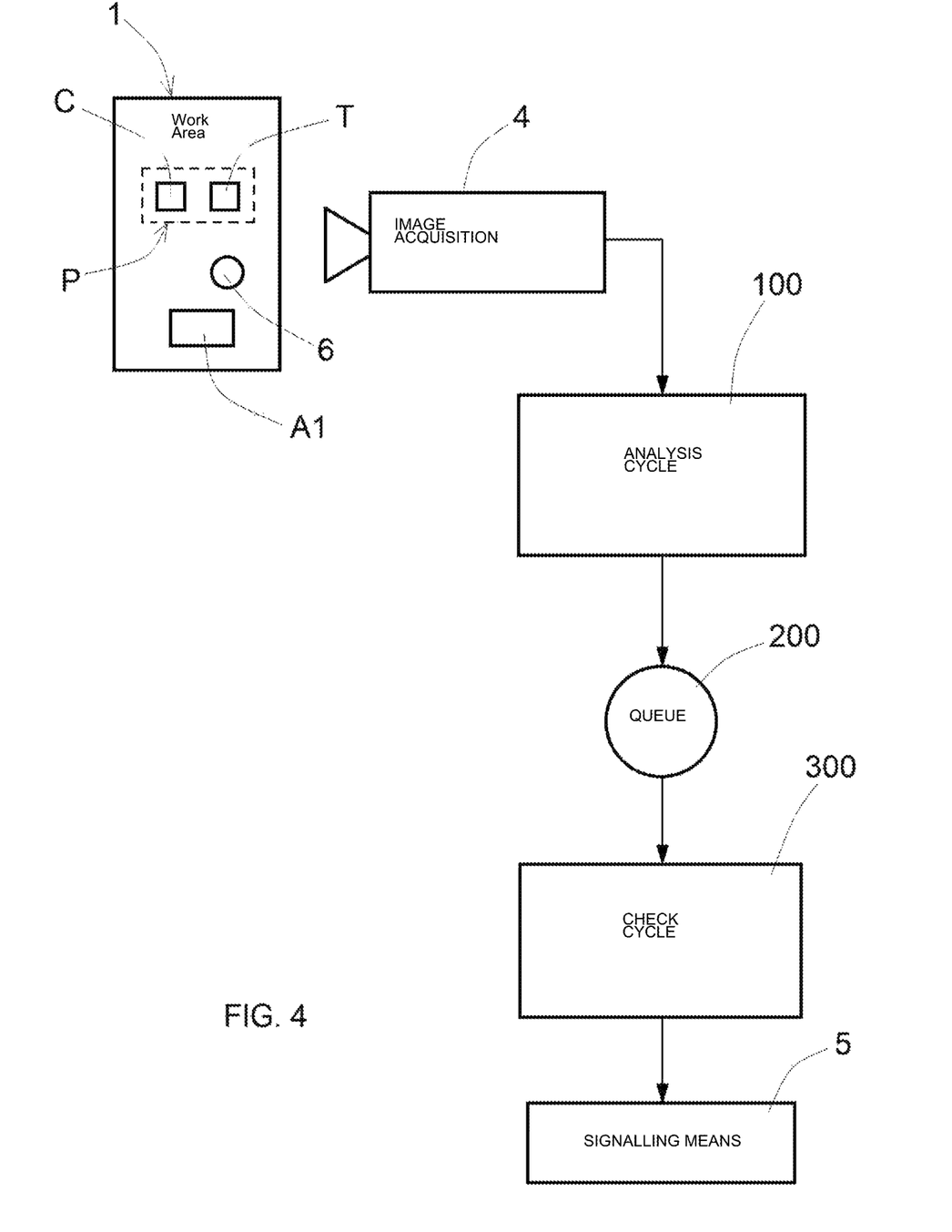
FIG. 4 is a flow diagram of the system according to the invention.

With reference to FIG. 4, during the real-time monitoring of the process in the work area (1) performed by the image acquisition means (4), the logic implementation of the system is characterized by two main flows:
- an analysis cycle (100) to process the images acquired by the acquisition means (4); and
- a check cycle (300) to interpret and verify the events that characterize the process, according to the data processed by the analysis cycle (100) that are queued to the processed images in a queue (200).

The check cycle (300) generates outgoing signals that are sent to the signaling means (5) to signal information during the process.

The software of the PC (2) contains an information structure defined as Job composed of a sequence of steps (Tasks). Each Task maintains the information of a specific action. The logic division in Tasks is a responsibility of the Job programmer, who will also set the elements and the significant steps of the process and of its monitoring. The creation of a Job does not require a specific knowledge on information programming because it is a guided procedure wherein the necessary steps are proposed in a sequence and the information is entered with an intuitive user-friendly graphic interface. It is simply necessary to fill out specific fields based on the characteristics of the process to be monitored. The software will store and relate the information, automatically assembling the process control logic, step by step.

After starting the system, the operator selects the Job relative to the activity to be monitored. Then the system activates the two main cycles (analysis and check) and starts analyzing the images acquired by the image acquisition means (4) sequentially, until the logic sequence of the Job ends.

The checking is performed Task after Task in the preset sequence (always starting from the first Task). The Job is concluded when all Tasks are successfully completed. Now the system is ready for a new initialization in order to process a new cycle of the same job, i.e. to check the realization of a new artifact (6).

The function of the analysis cycle (100) is to extract all the available information from each acquired image that is analyzed.

The most significant information refers to the position of the active elements, which are represented by the actors (A1, A2). The movement of the actors (A1, A2) in the work area (1) generates an excitation map that represents the areas with a concentration of variations with respect to the preceding images, i.e. the areas of interest of an image that must be searched for new events.

The parking (or deposition) position (or station) of the passive subjects (P) (tools T1, T2, T3 and components C1, C2, C3) is fixed and must be set when the Job is created; therefore the system will carry out a deeper investigation on a passive element when its position falls inside an excitation area.

Figure 5:
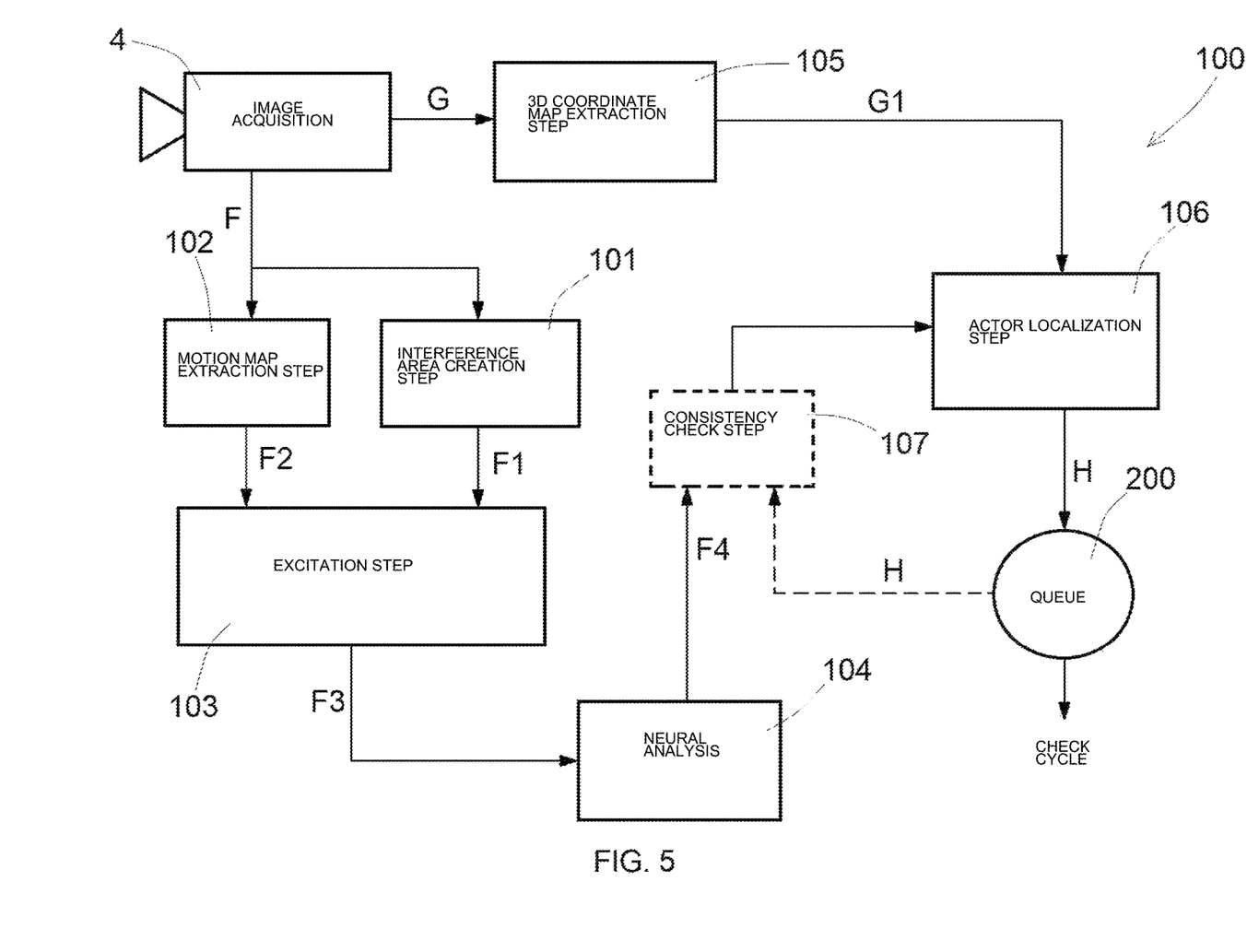
FIG. 5 is a flow diagram of an analysis cycle of a job.

With reference to FIG. 5, the analysis cycle (100) starts with a Job loading step, wherein the operator selects the Job to be loaded from the PC software. Successively, a Task loading step is performed, wherein the software loads a Task of the selected Job.

Then the analysis cycle performs a waiting step, wherein it waits for the images acquired in real time by the image acquisition means (4).

The acquired images are divided in 2D images (F) and 3D maps (G). These images are typically acquired with a 3D camera capable of providing the 2D view (F) of the work area (1), with colors or b/w, and the 3D map (G) of the work area (1), which is normally represented in false color and correlated with the 2D image.

The 2D image (F) is a matrix of pixels that consists in a number of lines by columns that corresponds to the camera resolution: if the image is a monochromatic image, each pixel is characterized by a set of three fundamental values comprising the pixel coordinates (line and column) with respect to the complete matrix and the light intensity expressed with a gray tone scale; if the image is a color image, an additional set of three values in the space of RGB (Red, Blue, Green) color is used instead of the light intensity.

The 3D image or 3D map (G) is a matrix of pixels with the same dimensions as the 2D image, wherein the set of three fundamental values of each pixel consists in the pixel coordinates (line and column) with respect to the complete matrix and in the distance of the pixel from the observation point of the camera or in the spatial coordinates (X, Y and Z) of the pixel.

The 2D images can be filtered by means of a filtering step in such a way to obtain 2D filtered images. The filtering operation of a 2D image is optional and its only purpose is to improve the image in order to facilitate the identification of the elements of interest to be identified by means of neural analysis. The quality of the image may depend on the acquisition sensor, as well as on the ambient conditions (for example, lighting), which may vary from implementation to implementation. According to the specific case, it will be necessary to overexpose or underexpose the image and/or use suitable software filters in order to emphasize the useful details.

The 2D images (F) are processed in an interference area creation step (101), wherein an interference area is created around each passive element (P) in such a way to obtain processed 2D images (F1) with interference areas around the passive elements.

Moreover, the 2D images (F) are analyzed in a map extraction step (102), wherein a motion map (F2) is extracted from the 2D images.

The motion map (F2) is realized by comparing two or more temporally consecutive images, usually by subtraction. The images of the same scene tend to remain unaltered when fixed elements are framed, whereas they vary in the areas with moving elements. By subtracting the pixel intensity values between the images, the static areas will tend to be black, and the motion areas will be light-colored.

The motion areas of the movement map (F2) do not contribute dimensional information or semantically significant information for the interpretation of the events in the scene, but can be used as filter or mask on the image that will be analyzed by the neural network. In fact, since the system searches for interactions between subjects, in absence of motion, it can be supposed that no significant event is in progress. Using the motion map (F2) as mask on the image to be analyzed by the search algorithms of the neural analysis system, the image will have reduced dimensions and the search will be faster.

The processed 2D images (F1) with interference areas around the passive elements and the motion map (F2) are sent to an excitation step (103), wherein each passive element (P) with an interference area included in a motion area of the motion map (F2) is put in an excitation status, i.e. is identified as subject that is worth a check. Therefore, when the system searches for interactions between the interference areas, the search can be limited to the excited subjects. In view of the above, a motion map with excited subjects (F3) is obtained.

The masking techniques are introduced in order to maximize the efficiency of the system check cycles because the system will have to operate in real time, with a speed that is directly proportional to the number of acquired images (and therefore to the number of images to be processed) in the time unit, which corresponds to the so-called system frame rate.

The motion map with excited elements (F3) is sent to a neural network wherein a neural analysis step (104) is performed to search for the actors (A1, A2).

The search of the actors (A1, A2) is the primary task of the analysis by means of neural network. During the programming step, the system is instructed to recognize the actors (A1, A2) by means of a graphic signaling. Otherwise said, the user can highlight the actor on the images of a significant sequence taken during a sample job performance by means of a graphic instrument provided by the user interface.

The highlight action simply consists in surrounding the area occupied by the figure of an actor (A1, A2) on an image using a pointing device of the PC (usually the mouse), repeating this operation for a sufficient number of images in order to represent the actor in a sufficient variety of positions that may be taken to perform the job. This information is the training base of the neural network to enable the automatic recognition of the actor during the ordinary operation of the system.

A 3D coordinate map (g1) is extracted from the 3D images (G) by means of a 3D coordinate map extraction step (105).

The 3D cameras of the image acquisition means (4) usually provide two types of information:
  the 2D image of the scene, which can be a standard image (a monochromatic or color image) or an image with false colors that represent the distances of the artifacts from the viewpoint and
  a 3D map that correlates the points of the 2D image with the positions in the real 3D space.

If an image is a 2D pixel matrix referred to the axes X2D and Y2D, wherein the value of each line-column pair expresses the luminous intensity instead of the distance of the point, the relative 3D map will be a matrix with the same dimensions, wherein the value of each line-column pair referred to the 2D image will correspond to a position in the 3D real space through a set of three values (X3D, Y3D, Z3D).

In this way, it will be possible to determine the position in the 3D space for each representative point of a subject in the 2D image by reading the set of three values of the 3D map referred to the coordinates (X2D, Y2D).

During the neural analysis step (104), the neural analysis for searching the actors (A1, A2) is applied in real time on the 2D images of the work area (1). Obviously, the neural network must be trained previously, i.e. the artificial intelligence system must have completed a deep learning process suitable for the purpose.

The learning method of the neural network is of supervised type: in a significant sequence of example images, the actors (A1, A2) are graphically highlighted and the neural network stores a set of information that enables the artificial intelligence to identify the actors during the ordinary operation of the system thanks to a generalization of the learned information, which may be used to produce the desired results, by the so-called "inductive hypothesis", also in unprecedented situations for the system. Identifying the actors (A1, A2) means to determine their position in the 2D image, i.e. to detect the barycenter of the area occupied by the actors.

The neural analysis step (104) provides actor position data (F4) that indicates the position of an actor (A1, A2) in each 2D image.

The actor position data (F4) and the 3D coordinate map (G1) are sent to an actor localization step (106) wherein the actors are localized in a 3D space. The actor localization step (106) converts the 2D coordinates into 3D coordinates, bringing the 2D coordinates in a real 3D space, according to the aforesaid procedure. Therefore, the positions of the actors (H) are obtained from the actor localization step (106) and are queued in a queue (200) in order to be used in the check cycle (300).

According to the learning quality or to the complexity level of the actor identification process (A1, A2) performed by the neural analysis step (104), the neural analysis may provide false information, i.e. may detect false actors or may not recognize them in the scene. In order to remedy these situations, a consistency check step (107) is performed at the end of the neural analysis step (104), which is based on the expected positions of the actors, wherein the trajectories of the actors are checked.

By storing the preceding positions of the actors in the queue (200), in a number that depends on the type of check to be performed, it can be checked whether a position acquired in a certain moment can be considered as consistent with the sequence of preceding positions, i.e. with the trajectory followed by the actor during its motion.

The following data can be considered to calculate the plausible trajectory of an actor:
  only the position of the actor in a sequence of images;
  the position and the displacement speed;
  the position, the speed and the acceleration.

After the calculation in the consistency check step (107), if the position of the actor (H) is considered to be plausible, the position is added to the queue (200), eliminating the oldest value stored in the queue and updating the database for the next compatibility check.

The blocks of FIG. 5 show the main steps of the analysis cycle:
  the 3D coordinate map extraction step (105);
  the neural analysis step (104) for searching the actors, and
  the actor localization step (106) to localize the actors in a 3D space.

The decision to use the neural analysis for searching the actors is mainly due to the fact that the actors (A1, A2) are dynamic elements who make complex movements. Said movements cannot be referred to sufficiently precise and repetitive geometrical shapes, and therefore cannot be used for recognition purposes by means of traditional localization algorithms (pattern match) based on geometrical principles.

Figure 6:
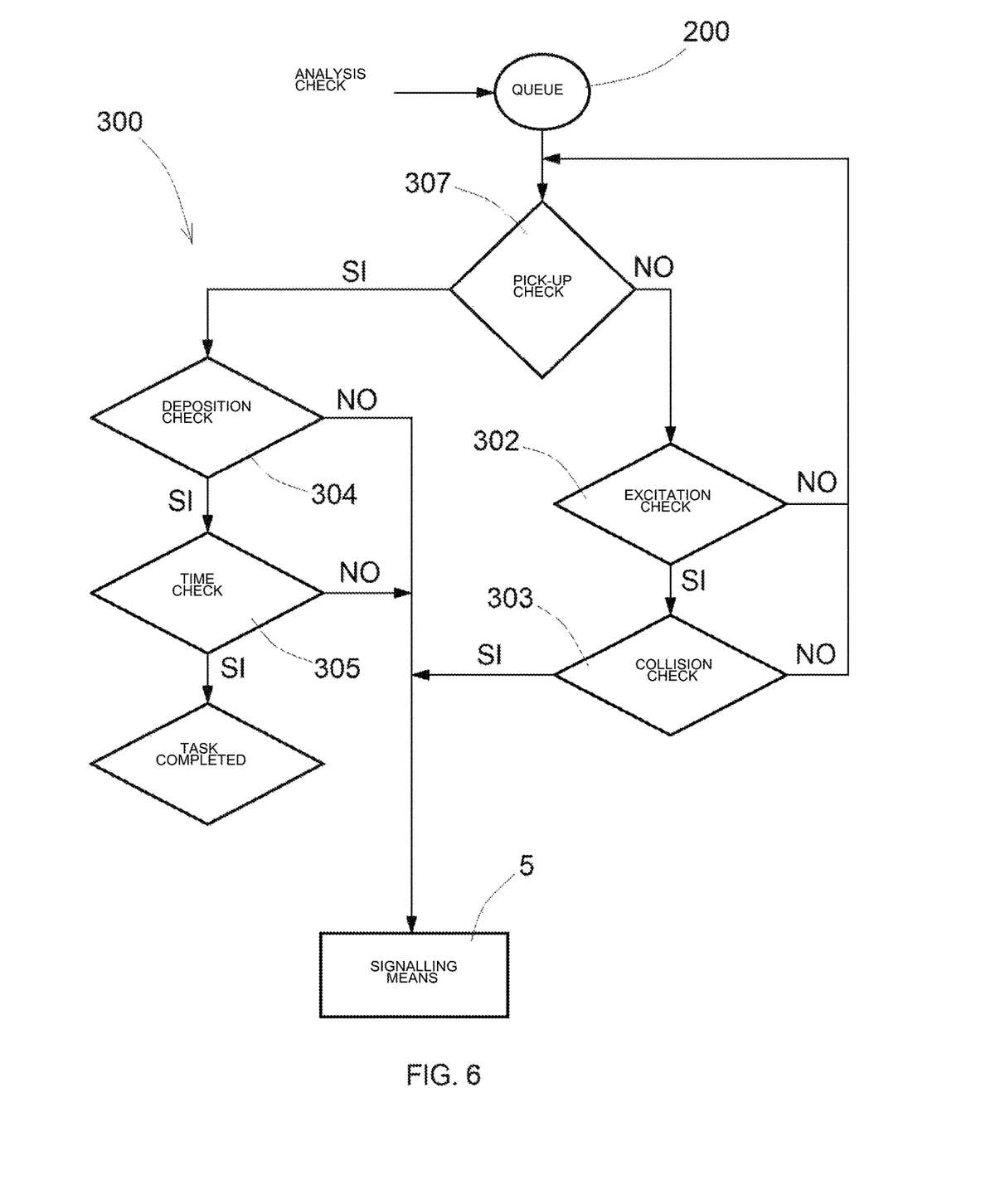
FIG. 6 is a flow diagram of a check cycle of a job.

With reference to FIG. 6, the check cycle (300) is dedicated to:
- determine whether new significant events occur in the work area (1);
- interpret the new events, updating the status of the Task in progress and calculating the effects on the Job to which the Task belongs.

The update of the Task status consists in a set of checks. A pick-up check step (301) is performed to assess whether all passive elements (P) (tools (T1, T2, T3) and components (C1, C2, C3)) were picked up by the actors (A1, A2).

If the actors did not pick up all the passive elements (P), the following steps are performed for each tool or component:
- an excitation check step (302) to check whether the passive element is in excitation area, i.e. to check whether its characteristic position (center of the interference circle) falls in a motion area; and
- a collision check step (303) to check whether the passive element collides against an actor, i.e. to check whether the 3D position of the actor (A1, A2) falls in the interference sphere of the passive element.

In case of collision, an alarm signal is sent by means of the signaling means (5). Moreover, such an alarm signal can be used as feedback for a Tool (for example, the system detects a dangerous situation (collision) and stops a robot, or stops a drill in the hands of the operator, etc.).

If the actors picked up all the passive elements (P), a deposition step (304) is performed to check whether all tools (T1, T2, T3) are deposited.

The "deposited" status of a tool corresponds to the fact that, if an actor (A1, A2) interacted with the tool (T1, T2, T3) for a first time, then it must have been a pick-up, whereas it must be a deposition for a second time. Such an assumption may be weak, and therefore an additional check based on neural analysis can be implemented. Following to a learning operation with the tools in idle position in the containers, the actual presence or absence of the tools must be detected, and then it must be checked whether an interaction ended with a pick-up or with a deposition.

If not all tools were deposited, an alarm signal is generated with the signaling means (5).

If all tools were deposited, then a time check step (305) is performed to check whether the Task execution time is compatible with the time that was set when programming the Task by means of direct comparison.

If the time is not compatible, i.e. it is lower than the programmed time, the permission to continue with the next Task is refused, and the operator is informed of such a suspicious situation with the signaling means (5), returning to the pick-up check step (301).

If the time is compatible, the Task is completed and the index of the following Task is updated.

With the data from the analysis cycle (100), i.e. the positions of the actors (A1, A2) and the presence of excitation areas, the check cycle (300) repetitively checks the current status of each significant object for the specific Task in the scene, in such a way to check whether all actions are performed according to the settings made when programming the job.

Otherwise said, the check cycle (300) checks whether all the tools (T1, T2, T3) and the components (C1, C2, C3) involved in the current Task were picked up and used correctly. With reference to the tools, it must be checked whether they were correctly stored after use. The tools are not an integral part of the artifact. They are tools that are temporarily used by the actors during the realization of the artifact. When the conditions are met, the Task is successfully completed.

In case of new positions of the actors, it must be checked whether they interfere with the positions (or stations) of the tools and of the components, in order to determine the collisions and the use status of the tools and components involved in the current Task. Accordingly, it will be possible to decide whether a component was added to the artifact and a tool was correctly used and stored.

Considering the components as elements that need to be assembled in order to proceed in the realization of the artifact, the interference of the actors with precise areas of the artifact is a potential evidence of the installation of a certain component.

The collision check is based on the search of the interference detected between the representative position of an actor, i.e. its barycenter, and the occupation volume of a passive subject (tool or component).

The operational flow of the system also comprises a set of checks of the execution time of the various characteristic operations of the work steps, compared to the time that was set during the programming step. The purpose of the system is to check the correct execution of all the steps of a certain job ("motion-step method poka-yoke") according to preset rules, i.e. to guide a process in such a way to optimize the execution time and methods.

Moreover, the system optionally supports the management of parallel check flows. For instance, multiple image acquisition means (4) can be integrated and some of them can be used to acquire useful images to highlight specific areas of the scene or of the artifact, in order to perform cross-checks on the correct realization of the Job.

We claim:
1. Check procedure of a production process of a product comprising the following steps:
- definition of a job that comprises a plurality of tasks;
- identification of a work area wherein the product is to be produced;
- allocation of passive elements comprising components and tools for producing the product in the work area;
- provision of image acquisition means suitable for acquiring 2D images and 3D images in the work area wherein said passive elements are picked out by at least one actor for producing the product;
- creation of interference areas in the 2D images around each passive element and around the product;
- extraction of a movement map from the 2D images wherein areas with movement are identified;
- excitation of the passive elements, the interference areas of the passive elements interfering with the areas with movement in such a way to obtain a movement map with excited elements;
- neural analysis of the movement map with excited elements in order to identify the actors in the movement map with excited elements;
- extraction of a 3D coordinate map from the 3D images in such a way to obtain a 3D coordinate map;
- actor localization based on the results of the neural analysis and on the 3D coordinate map to find the position of the actors in a 3D space;
- queuing of the position of the actors in a 3D space in a queue;
- picking-out check to check that all the passive elements have been picked out by the actors based on the task to be executed;

if not all the passive elements have been picked out, an excitation check is executed for each passive element to check whether the passive element is in excitation;

if the passive element is in excitation, a collision check is executed to check whether the passive element is in collision with another element; if a passive element is in collision with another element, an alarm signal is transmitted to signaling means;

if all the passive elements have been picked out, a deposition check is performed to check whether all the tools have been deposited in their initial position; if not all the tools have been deposited in their initial position within a preset time, an alarm signal is transmitted to the signaling means;

after depositing all the tools, a time check is executed to check the execution time of the task; if the execution time of the task is lower than a preset threshold value, the task is considered to be concluded, otherwise an alarm signal is transmitted to the signaling means.

2. The procedure of claim 1, also comprising a consistency check step to check whether a position of an actor acquired in a given moment is consistent with the sequence of preceding positions, analyzing the trajectory followed by the actor during its movement.

\* \* \* \* \*